ically amines there are used amino compounds which are capable of forming diazonium compounds. The diazotizable amino group may be bound to an aryl radical connected to the heterocyclic ring or directly to the heterocyclic ring. Compounds of this kind are for example amino-carbazoles, amino-quinolines, amino-diphenylene oxides, amino-benztriazoles, amino-benzthiazoles, amino-benzimidazoles, amino-tetrazoles, amino-triazoles, amino-thiazoles, amino-pyrazoles or amino-indazoles.

United States Patent Office 3,132,131
Patented May 5, 1964

3,132,131
AMINOAZO COMPOUNDS OF THE BENZIMIDAZOLE SERIES
Hasso Hertel and Reinhard Mohr, Offenbach (Main), Germany, assignors to Farbwerke Hoechst Aktiengesellschaft vormals Meister Lucius & Brüning, Frankfurt am Main, Germany, a corporation of Germany
No Drawing. Filed Dec. 18, 1961, Ser. No. 160,315
Claims priority, application Germany Dec. 24, 1960
6 Claims. (Cl. 260—157)

The present invention relates to new aminoazo compounds of the benzimidazole series of the general formula

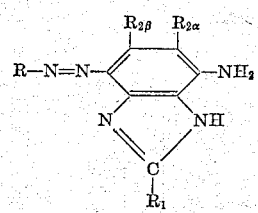

wherein R is a member of the group consisting of phenyl, lower alkylphenyl, lower alkoxyphenyl, chlorophenyl, methylchlorophenyl, methylnitrophenyl, methoxychlorophenyl, methoxynitrophenyl, chlorophenoxychlorophenyl, acetylphenyl, sulfophenyl, naphthyl, anthraquinonyl, methylchlorobenzimidazolyl and 1-phenyl-5-imino-4,5-dihydro-1,2,4-triazolyl radical; $R_1$ is a member of the group consisting of hydrogen, hydroxyl and lower alkyl; and $R_{2\alpha}$ and $R_{2\beta}$ are members of the group consisting of hydrogen, lower alkyl and lower alkoxy, at least one of the substituents $R_{2\alpha}$ and $R_{2\beta}$ being a member of the group consisting of lower alkyl and lower alkoxy.

The new compounds are prepared by coupling a diazonium compound of an aromatic or heterocyclic amine with a 7-amino-benzimidazole of the general formula

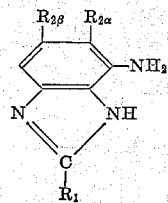

in which $R_1$ and $R_{2\alpha}$ and $R_{2\beta}$ have the meanings indicated above.

As diazo components there may be used in the process of the present invention aromatic or heterocyclic amines which are normally used for the manufacture of azo-dyestuffs. As aromatic amines there may be mentioned for example those of the benzene, naphthalene, anthracene or pyrene series which may contain in the aromatic nucleus substituents, such as halogen atoms, trifluoromethyl, hydroxyl, alkoxy, alkyl, carboxylic acid, carboxylic acid amide, carboxylic acid ester, sulfonic acid, sulfonic acid amide, alkylsulfone, arylsulfone, acylamino, alkylamino, dialkylamino, arylamino, nitro, acyl, cyano, aryloxy or arylazo groups.

As heterocyclic amines there are used amino compounds which are capable of forming diazonium compounds. The diazotizable amino group may be bound to an aryl radical connected to the heterocyclic ring or directly to the heterocyclic ring. Compounds of this kind are for example amino-carbazoles, amino-quinolines, amino-diphenylene oxides, amino-benztriazoles, amino-benzthiazoles, amino-benzimidazoles, amino-tetrazoles, amino-triazoles, amino-thiazoles, amino-pyrazoles or amino-indazoles.

As coupling components there are used 7-amino-benzimidazoles of the aforesaid formula which can easily be obtained by reducing the corresponding 7-nitro-benzimidazoles, for example with iron and hydrochloric acid, or by catalytic reduction. The 7-nitro-benzimidazoles can be prepared by known methods, for example by cyclization of 1-nitro-2,3-diaminobenzenes with aliphatic carboxylic acids of low molecular weight, such as formic acid, acetic acid or propionic acid, or by nitrating benzimidazoles of the general formula

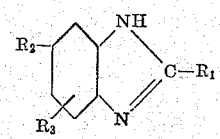

in which $R_1$ represents a hydrogen atom or an alkyl radical, $R_2$ represents a halogen atom, an alkyl or alkoxy group and $R_3$ represents a hydrogen or halogen atom, an alkyl or alkoxy group, with nitric acid in concentrated sulfuric acid at a temperature between about $-20°$ C. and $50°$ C.

The coupling of the diazonium compounds of the aromatic or heterocyclic amines with the 7-amino-benzimidazoles to form the new aminoazo compounds can be conducted by known methods. According to the capability of coupling of the diazonium compound the coupling may be carried out in a neutral, acid or alkaline aqueous solution or suspension. In some cases it is suitable to conduct the coupling in the presence of organic solvents, such as acetic acid, alcohols, ketones, dimethylformamide or pyridine. The aminoazo compounds can be isolated in the form of the free bases or in the form of their salts, for example as hydrochlorides or sulfates.

The new compounds are colored crystals. They may be used as dyestuffs or intermediates for the manufacture of dyestuffs. They are suitable for example, if desired, after acylation, oxalkylation or cyanoalkylation of the amino group, as disperse dyestuffs for dyeing synthetic fibers, such as polyamide, polyurethane, polyester or acetylcellulose fibers.

The following examples serve to illustrate the present invention, the parts being by weight unless otherwise stated, and the relationship of parts by weight to parts by volume being the same as that of the kilogram to the liter.

*Example 1*

147 parts of 7-amino-5-methylbenzimidazole are dissolved in 2000 parts by volume of water and 350 parts by volume of hydrochloric acid of 20° Bé. To this solution a diazo solution is added which is prepared in the usual manner from 93 parts of aniline, 290 parts by volume of hydrochloric acid of 20° Bé. and 69 parts of sodium nitrite. By slowly dropping in an aqueous solution of 750 parts of crystallized sodium acetate, the aminoazo compound separates in crystalline form. When the coupling is complete, the precipitated hydrochloride of the aminoazo compound of the formula

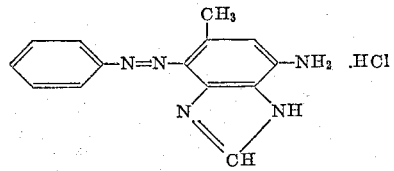

is filtered off, washed and dried. The yield is nearly quantitative. The free aminoazo compound crystallizes in the form of golden-yellow plates melting at 222° C.

*Example 2*

175 parts of 3-amino-1-phenyl-5-imino-4,5-dihydro-1,2,4-triazole are dissolved in a mixture of 1000 parts by volume of water, 500 parts by volume of nitric acid of 62.5% strength and 2000 parts of ice. The mixture is then diazotized at a temperature between −5° C. and −8° C. by the addition of 200 parts by volume of 5 N-sodium nitrite solution. After about 2 minutes the clear yellow diazo solution is introduced in one jet into a solution of 147 parts of 7-amino-5-methylbenzimidazole in 2000 parts by volume of water, 500 parts of ice and 300 parts by volume of 5 N-hydrochloric acid. The coupling is complete after about 1 minute. The aminoazo compound obtained is filtered off, washed with a small quantity of cold water and dissolved in hot water. After filtering with some animal charcoal the aminoazo compound is separated in the form of the hydrochloride by the addition of concentrated hydrochloric acid. When the precipitation is complete, the hydrochloride is filtered off, washed with a small quantity of cold water and methanol and dried at 50° C. 340 parts of the dihydrochloride of the aminoazo compound of the formula

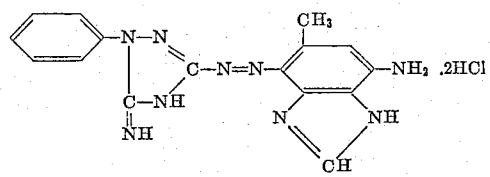

are obtained in the form of red crystals.

The following table indicates further compounds of the general formula

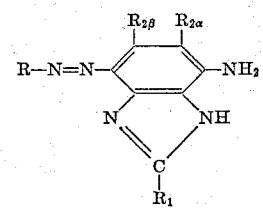

which can be obtained in accordance with the process of the present invention.

| R | R¹ | R₂α | R₂β | Melting point, ° C. |
|---|---|---|---|---|
| 2-methoxy-5-nitrophenyl. | hydrogen | hydrogen | methyl | 305 to 307. |
| 2-methylphenyl | do | do | do | 230 to 231.5 |
| 2-methyl-4-chlorophenyl. | do | do | do | 226 to 228 |
| 2-methoxyphenyl | do | do | do | 243 to 245 |
| 2-methoxy-5-chlorophenyl. | do | do | do | 260 to 260.5 |
| 2-chlorophenyl | do | do | do | 233 to 235 |
| 2-methyl-5-nitrophenyl. | do | do | do | 285 to 287 |
| 2-methyl-6-chlorobenzimidoazolyl-(7). | do | do | do | >320 |
| 4-methoxyphenyl | hydrogen | hydrogen | methyl | 258 to 259 |
| Naphthyl-(1) | do | do | do | 244 to 246 |
| 2-methoxy-4-chlorophenyl. | do | do | do | 249.5 to 251 |
| 2-choloro-5-methylphenyl. | do | do | do | 229 to 230 |
| 3-methylphenyl | do | do | do | 253.5 to 255 |
| 2-ethoxyphenyl | do | do | do | 226 to 228 |
| 4-methoxyphenyl | methyl | do | do | 200 to 202 |
| 2-chlorophenyl | do | do | do | 235 to 236 |
| 2-methoxyphenyl | do | do | do | 211 to 212 |
| 2-methoxy-5-chlorophenyl. | do | do | do | 225 to 226 |
| 2-(4'-chlorophenoxy)-5-chlorophenyl. | do | do | do | 220 to 222 |
| 4-acetylphenyl | do | do | do | 228 to 230 |
| 2-methoxy-5-chlorophenyl. | hydrogen | methoxy | methoxy | 271 to 273 |
| 2-methoxyphenyl | do | do | do | 236 to 239 |
| 2-methoxy-5-nitrophenyl. | do | do | do | 274 to 275 |
| Phenyl | do | hydrogen | do | 218 to 220 |
| 4-sulfophenyl | do | do | methyl | |
| Do | methyl | methyl | hydrogen | |
| Do | hydroxy | hydrogen | methyl | |
| Anthraquinonyl-(1) | methyl | methyl | hydrogen | 225 to 230 |
| 2-methyl-5-nitrophenyl. | do | do | do | 255 to 256 |
| 2-methoxy-4-nitrophenyl. | do | do | do | 255 |
| 2-methoxy-5-nitrophenyl. | hydrogen | hydrogen | ethyl | 147 to 148 |

We claim:
1. Aminoazo compounds of the formula

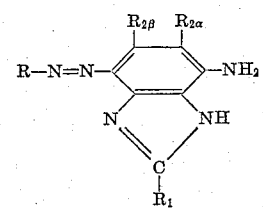

wherein R is a member of the group consisting of phenyl, lower alkylphenyl, lower alkoxyphenyl, chlorophenyl, methylchlorophenyl, methylnitrophenyl, methoxychlorophenyl, methoxynitrophenyl, chlorophenoxychlorophenyl, acetylphenyl, sulfophenyl, naphthyl, anthraquinoyl, methylchlorobenzimidoazolyl and 1-phenyl-5-imino-4,5-dihydro-1,2,4-triazolyl radical; R₁ is a member of the group consisting of hydrogen, hydroxyl and lower alkyl; and R₂α and R₂β are members of the group consisting of hydrogen, lower alkyl and lower alkoxy, at least one of the substituents R₂α and R₂β being a member of the group consisting of lower alkyl and lower alkoxy.

2. The aminoazo compound of the formula

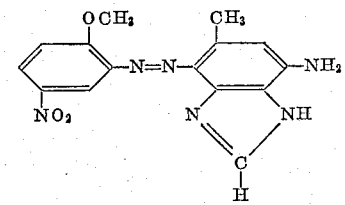

3. The aminoazo compound of the formula

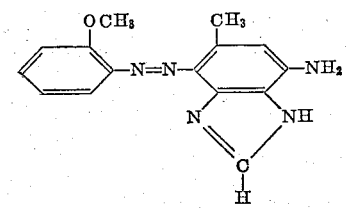

4. The aminoazo compound of the formula
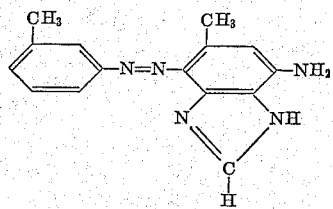
5. The aminoazo compound of the formula
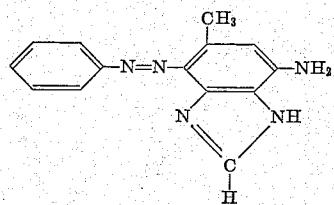
6. The aminoazo compound of the formula
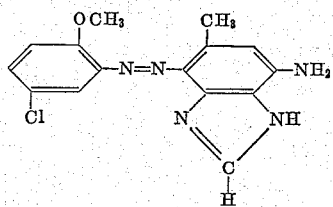
References Cited in the file of this patent
UNITED STATES PATENTS
| | | |
|---|---|---|
| 2,308,023 | Peterson | Jan. 12, 1943 |
| 2,475,506 | Lewis | July 5, 1945 |
| 2,479,944 | Lewis | Aug. 23, 1949 |
| 2,671,775 | Hanhart | Mar. 9, 1954 |